(12) United States Patent
Miyawaki et al.

(10) Patent No.: US 9,980,476 B2
(45) Date of Patent: May 29, 2018

(54) RACCOON TRAPPING MODULE AND RACCOON TRAPPING SYSTEM

(71) Applicant: Surge Miyawaki Co., Ltd., Tokyo (JP)

(72) Inventors: Yutaka Miyawaki, Tokyo (JP); Mieko Kawamichi, Kyoto (JP)

(73) Assignee: Surge Miyawaki Co., Tokyo (JP)

( * ) Notice: Subject to any disclaimer, the term of this patent is extended or adjusted under 35 U.S.C. 154(b) by 0 days. days.

(21) Appl. No.: 14/429,347

(22) PCT Filed: Sep. 20, 2013

(86) PCT No.: PCT/JP2013/075573
§ 371 (c)(1),
(2) Date: Mar. 18, 2015

(87) PCT Pub. No.: WO2014/046264
PCT Pub. Date: Mar. 27, 2014

(65) Prior Publication Data
US 2015/0237846 A1 Aug. 27, 2015

(30) Foreign Application Priority Data
Sep. 20, 2012 (JP) ................................ 2012-207560

(51) Int. Cl.
*A01K 69/06* (2006.01)
*A01M 23/08* (2006.01)
(Continued)

(52) U.S. Cl.
CPC ............ *A01M 23/00* (2013.01); *A01M 23/02* (2013.01); *A01M 23/16* (2013.01); *A01M 23/18* (2013.01);
(Continued)

(58) Field of Classification Search
USPC ................................................. 43/1, 61, 67
See application file for complete search history.

(56) References Cited

U.S. PATENT DOCUMENTS

| 4,080,749 A | 3/1978 | Gilbaugh |
| 4,158,929 A * | 6/1979 | Custard ................. A01M 23/24 43/58 |

(Continued)

FOREIGN PATENT DOCUMENTS

| JP | 3160342 U | 6/2010 |
| JP | 3170555 U | 9/2011 |
| JP | 3170556 U | 9/2011 |

OTHER PUBLICATIONS

Translation and original copy of the International Search Report dated Dec. 10, 2013 received in counterpart International Application No. PCT/JP2013/075573, 3 pgs.

(Continued)

*Primary Examiner* — Joanne Silbermann
(74) *Attorney, Agent, or Firm* — Shumaker & Sieffert, P.A.

(57) ABSTRACT

A raccoon trapping module which can be attached to an existing wildlife trapping cage to enable only raccoons to be trapped in the trapping cage, comprising at least a door which opens and closes an entrance of a horizontally long cage, a lock mechanism which locks the door in an open state, and a linkage member which is linked with a trigger member which performs a lock release operation of the lock mechanism, wherein a hollow housing is provided which is attached to an end part of the cage at the opposite side from the door, a surface of the housing at the door side has an arm insertion hole which enables a raccoon to insert a forearm, a baiting part in which bait is placed is provided inside of the housing within a range which a hand of the raccoon can reach when the raccoon inserts its forearm from the opening part, and a connecting member makes a linkage member (Continued)

perform a lock release operation of a lock mechanism by the action of a raccoon which takes bait from the baiting member.

13 Claims, 17 Drawing Sheets

(51) Int. Cl.
    *A01M 23/00*      (2006.01)
    *A01M 23/20*      (2006.01)
    *A01M 23/18*      (2006.01)
    *A01M 23/02*      (2006.01)
    *A01M 23/16*      (2006.01)
    *A01M 99/00*      (2006.01)

(52) U.S. Cl.
    CPC ............ *A01M 23/20* (2013.01); *A01M 99/00* (2013.01); *A01M 2200/00* (2013.01)

(56) References Cited

U.S. PATENT DOCUMENTS

| | | | | |
|---|---|---|---|---|
| 5,615,514 A * | 4/1997 | Meade, Jr. | ............ | A01M 23/20 43/61 |
| 7,216,457 B1 * | 5/2007 | Hanning, Jr. | ......... | A01M 23/18 43/66 |
| 2003/0009928 A1 * | 1/2003 | Stoddard | ............... | A01M 23/26 43/77 |
| 2006/0218849 A1 * | 10/2006 | Rich | ..................... | A01M 23/18 43/61 |
| 2008/0178516 A1 * | 7/2008 | Hall | ...................... | A01M 23/20 43/61 |
| 2011/0289821 A1 * | 12/2011 | Bonnot | ................. | A01M 23/34 43/86 |

OTHER PUBLICATIONS

Extended Search Report from counterpart European Application No. 13839802.9, dated May 20, 2016, 9 pp.

* cited by examiner

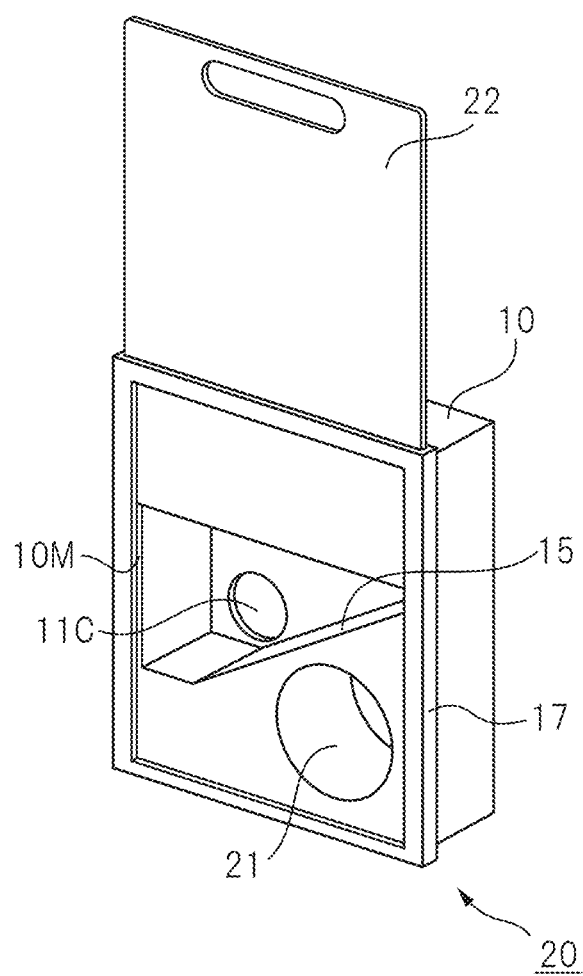

RACCOON TRAPPING MODULE AND RACCOON TRAPPING SYSTEM

This application is a national stage entry under 35 U.S.C. § 371 of International Application No. PCT/JP2013/075573, filed Sep. 20, 2013, which claims the benefit of JP Application 2012-207560, filed Sep. 20, 2012. The entire contents of International Application No. PCT/JP2013/075573 and JP Application 2012-207560 are incorporated herein by reference.

TECHNICAL FIELD

The present invention relates to a which raccoon trapping module which can be attached to a cage for trapping wildlife and enables only raccoons, which use their hands to take bait, to be trapped and to a raccoon trapping system.

BACKGROUND

In the past, there have been known traps for wildlife which use their mouths to take bait, for example, mousetraps. However, in recent years, damage due to wildlife other than mice such as raccoons, civets, and monkeys has been increasing. This is because of the spread of the habitats of such wildlife. The cause is the increasing sparsity of people living in mountainous areas due to depopulation and the increasing ability of wildlife to adapt to human habitats. Among these wildlife as well, in particular raccoons have a high likelihood of acting as carriers for raccoon roundworms, rabies, leptospirosis, and other infectious diseases which also afflict human beings and livestock. Their current habitats are encroaching on the large cities, so their trapping and relocation have been urgent topics in wildlife control. To deal with damage due to such wildlife, in particular to trap the hugely damaging raccoons, a trapping cage which utilizes the habits of raccoons is disclosed in PLT 1.

The trapping cage which is disclosed in PLT 1 is a wire cage made of metal which is provided with a front door which shuts when trapping a raccoon and a usually closed back door and which has a bait tray provided at the top near the back door. Bait is placed at the bait tray, and the front door closes when a raccoon enters the cage and takes the bait. That is, in the trapping cage which is disclosed in PLT 1, when a raccoon enters the cage and tries to take the bait by using its two hands to pull forward the bait cage in which the bait is contained, a wire rope which is connected to the bait cage is pulled and the lock holding the front door open is released whereupon the front door shuts. Further, the trapped raccoon is driven into an independent carry cage which can be attached adjoining the back door in the state where the back door is opened and the carry cage is detached from the trapping cage and transported elsewhere.

SUMMARY

In this regard, while the trapping cage which is disclosed in PLT 1 has a bait tray at the top near the back door, wildlife which enters the trapping cage and takes the bait by its mouth may also pulls on the bait on the bait tray. In this case, wildlife other than the wildlife desired to be trapped is liable to be mistakenly trapped. Further, in Japan, when a tanuki raccoon dog, which resembles a raccoon in appearance, is mistakenly trapped, the raccoon dog has to be immediately released since it is considered a native species and is not allowed to be trapped. The trapping cage therefore has to be constantly monitored. In this way, management was troublesome.

The present invention has as its object the provision of a raccoon trapping module which can be attached to an existing cage for trapping wildlife and which traps only wildlife which uses its hands to take bait, that is, raccoons, and cannot trap wildlife which takes bait without using its hands and the provision of a raccoon trapping system.

According to one aspect of the present invention, there is provided a raccoon trapping module which can be attached to a wildlife trapping cage which comprises at least a cage which holds a wildlife, a door which opens and closes an entrance at one end of the cage, a lock mechanism which locks the door in an open state, and a linkage member which is linked with a trigger member which performs a lock release operation of the lock mechanism when wildlife engages in the action of taking bait, wherein a hollow housing is provided which is attached to a module mounting hole which is formed by removing a back wall at an opposite side to the entrance, a surface of the housing at the entrance side has an arm insertion hole which enables a raccoon to insert a forearm, a baiting member in which bait is placed is provided inside of the housing within a range which a hand of the raccoon can reach when the raccoon inserts its forearm from the arm insertion hole, a connecting member is provided at the baiting member and connects with the linkage member, and if a raccoon engages in the action of taking bait from the baiting member, the connecting member makes the linkage member perform a lock release operation of the lock mechanism.

According to another aspect of the present invention, there is provided a raccoon trapping system comprising a cage which holds wildlife, a door which opens and closes an entrance at one end of the cage, a lock mechanism which locks the door in an open state, a linkage member which is linked with a trigger member which performs a lock release operation of the lock mechanism when wildlife engages in the action of taking bait, and a raccoon trapping module which makes the linkage member operate, wherein the raccoon trapping module is provided with a hollow housing which is attached to a module mounting hole which is formed by removing a back wall at an opposite side to the entrance, an arm insertion hole which is provided at the entrance side of the housing and enables a raccoon to insert a forearm, a baiting member which is provided inside of the housing, is positioned within a range which a hand of the raccoon can reach when the raccoon inserts its forearm from the arm insertion hole, and contains bait, and a connecting member which is provided at the baiting member and connects with the linkage member and wherein if a raccoon engages in the action of taking bait from the baiting member, the connecting member makes the linkage member perform a lock release operation of the lock mechanism.

BRIEF DESCRIPTION OF DRAWINGS

FIG. 4B is a perspective view of the raccoon trapping module which is shown in FIG. 4A as seen from the back surface side.

DETAILED DESCRIPTION

Below, the attached drawings will be used to explain in detail embodiments of a raccoon trapping module of the present invention based on specific examples. Note that component members which are provided with the same functions will be assigned the same reference notations in the explanation.

Figure 1A:
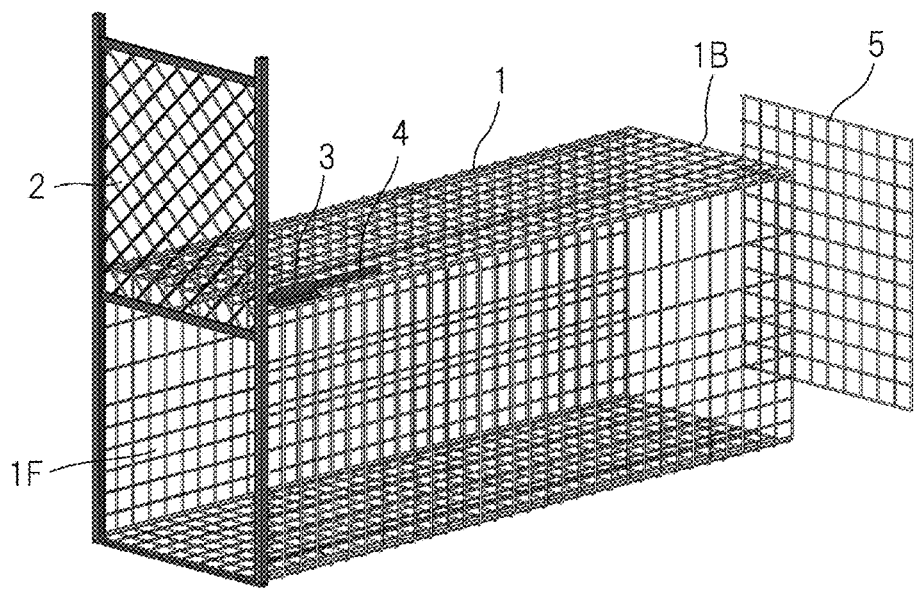
FIG. 1A is a perspective view which shows the structure of one example of an existing wildlife trapping cage to which is attached a raccoon trapping module of the present invention.

FIG. 1A shows the structure of one example of an existing wildlife trapping cage 1 to which is attached a raccoon trapping module of the present invention (sometimes referred to as simply the "cage 1"). This example of a wildlife trapping cage 1 is horizontally long. At an entrance 1F at one end part, a gravity drop type of door 2 is provided. When using the wildlife trapping cage 1 to trap wildlife, the gravity drop type of door 2 is pulled up and locked by a lock mechanism 3 so as to allow animals to enter the inside from the entrance 1F. At the lock mechanism 3, a linkage member 4 is connected. This linkage member 4 is connected to a trigger member (not shown) which is provided at a far side from the entrance 1F of the cage 1. At the trigger member, bait is attached. When wildlife which enters the cage 1 engages in the action of taking the bait, the trigger member is operated. The trigger member pulls against the linkage member 4, whereby the lock mechanism 3 is released, the door 2 drops down, and the wildlife is trapped.

Figure 1B:
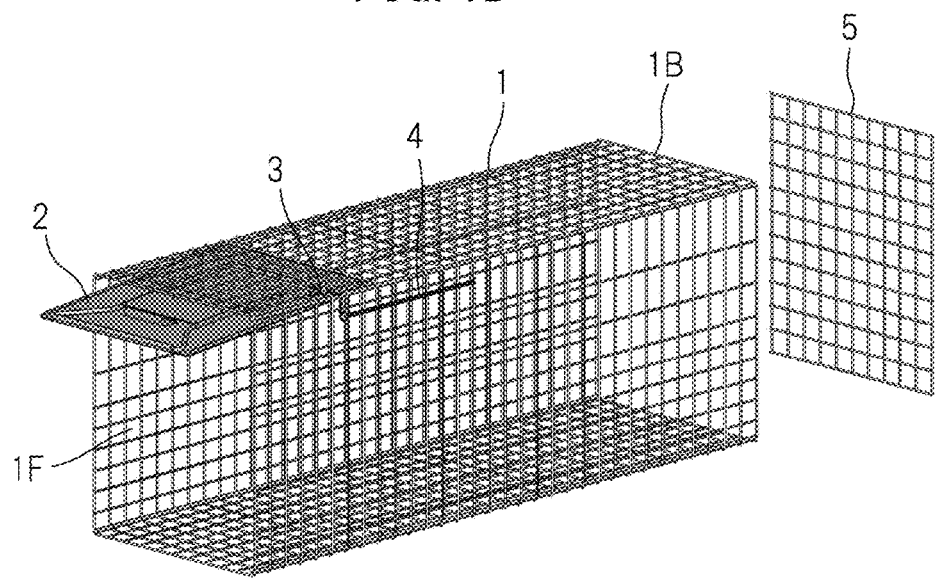
FIG. 1B is a perspective view which shows the structure of another example of an existing wildlife trapping cage to which is attached a raccoon trapping module of the present invention.

FIG. 1B shows the structure of another example of an existing wildlife trapping cage 1 to which a raccoon trapping module of the present invention is attached. This example of a wildlife trapping cage 1 is also horizontally long. At an entrance 1F at one end part, a spring type of door 2 is provided. When using this example of the wildlife trapping cage 1 to trap wildlife, the door 2 is made to move against the spring force and the door 2 is locked by the lock mechanism 3 in the state with the opening 1F opened so as to allow animals to enter from the entrance 1F. At the lock mechanism 3, a linkage member 4 is connected. This linkage member 4 is connected to a trigger member (not shown)

which is provided at a far side from the entrance 1F of the cage 1. At the trigger member, bait is attached. When wildlife which enters the cage 1 engages in the action of taking bait, the trigger member is operated. The trigger member pulls against the linkage member 4, whereby the lock mechanism 3 is released, the door 2 closes the entrance 1F by the spring force, and the wildlife is trapped.

When attaching the raccoon trapping module of the present invention to the existing wildlife trapping cage 1 which is shown in FIG. 1A and FIG. 1B, the wall (back wall) 5 at the end part at the opposite side to the entrance 1F of the existing wildlife trapping cage 1 is removed to provide an opening (module mounting hole) 1B. As the method of attaching the raccoon trapping module, there are the method of insertion into this module mounting hole 1B and the method of attachment to the outside of the module mounting hole 1B. Note that instead of removing the back wall 5 from the wildlife trapping cage 1, it is also possible to remove a side surface near the back wall 5 of the wildlife trapping cage 1 to exactly the size of the raccoon trapping module and insert the raccoon trapping module from the side surface.

Figure 2:
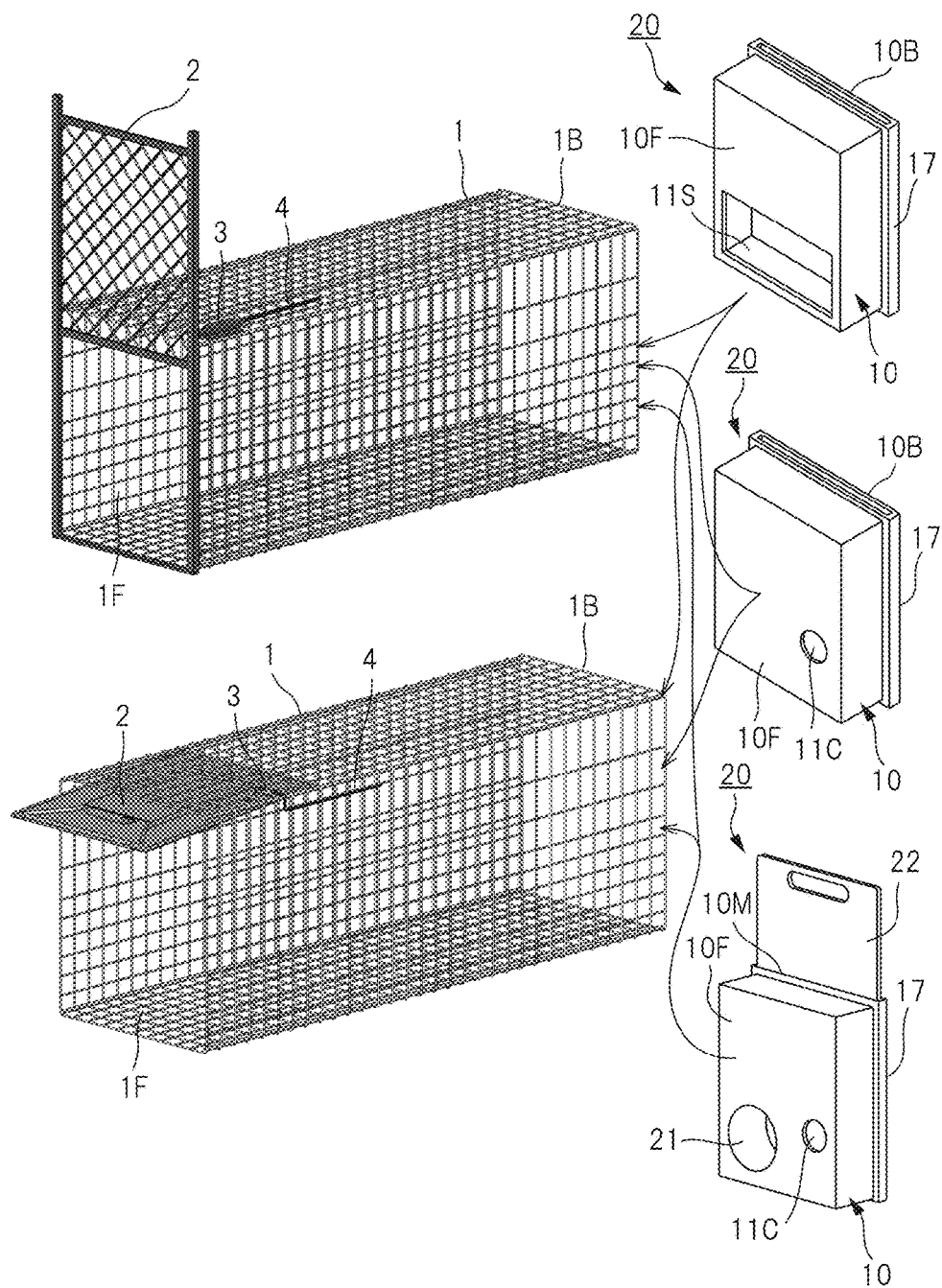
FIG. 2 is a perspective view which shows the appearance of three types of the raccoon trapping module of the present invention which is attached to the existing wildlife trapping cage which is shown in FIG. 1A and FIG. 1B.

FIG. 2 shows the appearance of three types of the raccoon trapping module 20 of the present invention which is attached to the module mounting hole 1B formed by removing the back wall 5 of the existing wildlife trapping cage 1 which is shown in FIG. 1A and FIG. 1B. The first type of raccoon trapping module 20 which is shown at the topmost part of FIG. 2 is provided with a hollow housing 10. The outside dimensions of this housing are equal to the inside dimensions of the cage 1. A predetermined depth and flange 17 are provided. The housing 10 may be formed by a plastic, but it may also be formed by wood. Further, at the bottom part of the surface 10F with no flange 17 of the housing 10 (surface at entrance 1F side of cage 1, hereinafter referred to as the "front surface"), an opening part 11S is provided. In the first type of raccoon trapping module 20, the opening part 11S is rectangular in shape. The size is a size enabling insertion of the forearm of the raccoon. The first type of raccoon trapping module 20 is used fastened in the state with the front surface 10F side inserted from the module mounting hole 1B of the cage 1 and the flange 17 abutting against the cage 1.

The second type of raccoon trapping module 20 which is shown at the center of FIG. 2 is provided with a plastic hollow housing 10 of a size the same as the first type of raccoon trapping module 20. The point of difference of the second type of raccoon trapping module 20 from the first type of raccoon trapping module 20 is only the point that the opening part 11S at the first type of raccoon trapping module 20 is a circular arm insertion hole 11C. The size of the arm insertion hole 11C need only be a size which enables insertion of the forearm of the raccoon and need not be circular. The second type of raccoon trapping module 20 is also used fastened in the state with the front surface 10F side inserted from the module mounting hole 1B of the cage 1 and the flange 17 abutting against the cage 1.

The third type of raccoon trapping module 20 which is shown at the bottommost part of FIG. 2 is provided with a plastic hollow housing 10 of a size the same as the first type and the second type of raccoon trapping module 20. The only point of difference of the third type of raccoon trapping module 20 from the second type of raccoon trapping module 20 is the point that the housing 10 is provided with a through hole 21 which runs through the housing 10. The size of the through hole 21 is a size enabling a raccoon to completely pass through it and should have a diameter of about 15 cm. This through hole 21 is used when making a raccoon move to a carry cage which adjoins the cage 1 after trapping the raccoon in the cage 1. The cross-sectional shape is not limited to a circular shape so long as a raccoon can pass through it. The shape of the through hole 21 may, for example, be a triangular shaped hole or other polygonal shaped hole or a shape the same as the shape of the space below a slope 15.

When providing the housing 10 with a through hole 21 which passes through the housing 10, to prevent the raccoon which was trapped in the cage 1 from escaping, the flange 17 of the housing 10 is provided with a groove 10M, the groove 10M holds a shutter plate 17 to be able to be pulled out, and the through hole 21 is closed at all times. When attaching the above-mentioned carry station to the back side of the housing 10, the shutter plate 17 may be opened and the raccoon moved from the through hole 21 to the carry cage, then the shutter plate 17 may be closed after it is moved.

FIG. 3A to FIG. 3D show the state of attachment of the first type of the raccoon trapping module 20 of the present invention which is shown in FIG. 2 to a wildlife trapping cage 1 and show several embodiments which show the configuration of the inside of the housing 10.

Figure 3A:
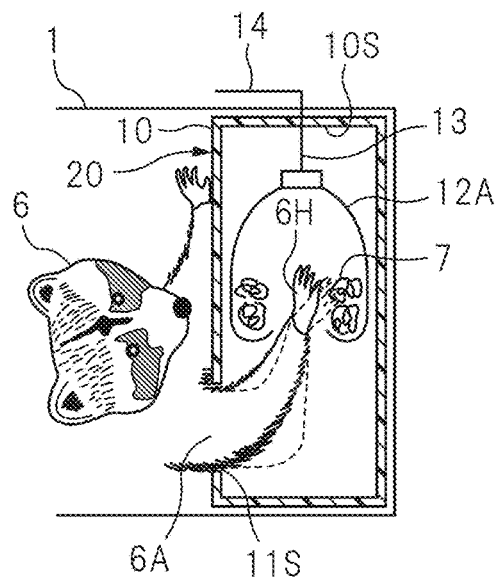
FIG. 3A is a cross-sectional view which shows the state of attachment of a first embodiment of the first type of the raccoon trapping module of the present invention which is shown in FIG. 2 to a wildlife trapping cage.

FIG. 3A shows the inside structure of a first embodiment of the first type of raccoon trapping module 20. Inside of the housing 10 of the first embodiment, a bait cage 12A is provided as a baiting part in which bait 7 is placed within a range which the hand 6H of a raccoon 6 can reach when a raccoon 6 inserts its forearm 6A from the opening part 11S. The bait cage 12A is suspended from the ceiling part 10S of the housing 10 by a wire 13. This wire 13 is connected to a connecting member 14 at the outside of the cage 1. The connecting member 14 connects to the linkage member 4 which is shown in FIGS. 1A and 1B and FIG. 2. The bait cage 12A is a bell shape with a bottom surface which is folded back to the top side from a hole which is provided at the center part. Bait 7 is placed at the folded back part. Assume that a raccoon bends its elbow as shown by the broken line with respect to the bait 7 and bends its wrist to try to take the bait 7. The thumb to little finger of a raccoon all can bend in the same direction, so a considerable range of bait 7 can be taken.

In the raccoon trapping module 20 of the first embodiment, if a raccoon 6 inserts its forearm 6A including its elbow into the opening part 11S, bends its elbow, and bends its wrist to take bait 7 from the bait cage 12A, the connecting member 14 moves through the wire 13. Further, due to movement of the connecting member 14, the linkage member 4 is pulled and the lock mechanism 3 which is shown in FIG. 1A and FIG. 1B and FIG. 2 performs a lock release operation, so the door shuts and the raccoon is trapped. With wildlife other than a raccoon, even if sticking a hand or nose into the opening part 11S, the hand or nose cannot reach the bait cage 12A, so the bait cage 12A is not pulled to the opening part 11S side and the door of the cage 1 is not shut. Accordingly, if using the wildlife trapping cage 1 to which the raccoon trapping module 20 of the first embodiment is attached, it is possible to trap only raccoons: other wildlife is not trapped.

Figure 3B:
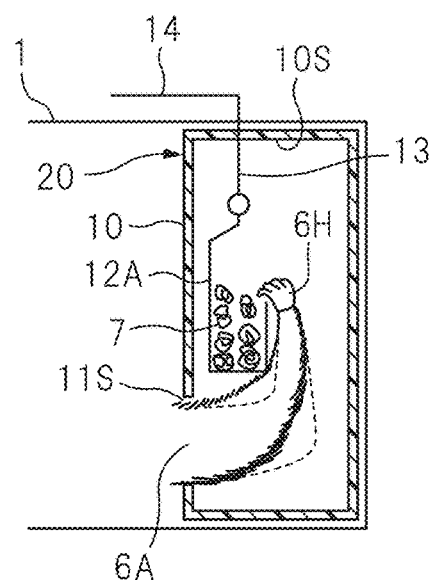
FIG. 3B is a cross-sectional view which shows the state of attachment of a second embodiment of the first type of the raccoon trapping module of the present invention which is shown in FIG. 2 to a wildlife trapping cage.

FIG. 3B shows the inside structure of a second embodiment of the first type of raccoon trapping module 20. At the inside of the housing 10 of the second embodiment, a bait cage 12A is provided as a baiting part in which bait is placed within a range which the hand 6H of a raccoon 6 can reach when a raccoon 6 inserts its forearm 6A together with its elbow from the opening part 11S. The bait cage 12A is suspended from the ceiling part 10S of the housing 10 by a wire 13. This wire 13 is connected to the connecting member 14 at the outside of the cage 1. The bait cage 12A of the second embodiment is suspended from a part near the front surface 10F of the housing 10. The opposite side from the front surface 10F opens so that bait 7 can be taken out.

In the raccoon trapping module 20 of the second embodiment, the raccoon 6 inserts its forearm 6A including the elbow into the opening part 11S, then bends its elbow as shown by the broken line and turns its hand 6H to take the bait 7 from the bait cage 12A, so the bait cage 12A is pulled toward the raccoon and the connecting member 14 moves through the wire 13. The operation after movement of the connecting member 14 is the same as the first embodiment. Wildlife other than raccoons cannot insert their hands from the opening part 11S and move them around there, so the door of the cage 1 will never shut. Accordingly, if using the wildlife trapping cage 1 to which the raccoon trapping module 20 of the second embodiment is attached, it is possible to trap only raccoons: other wildlife is not trapped.

Figure 3C:
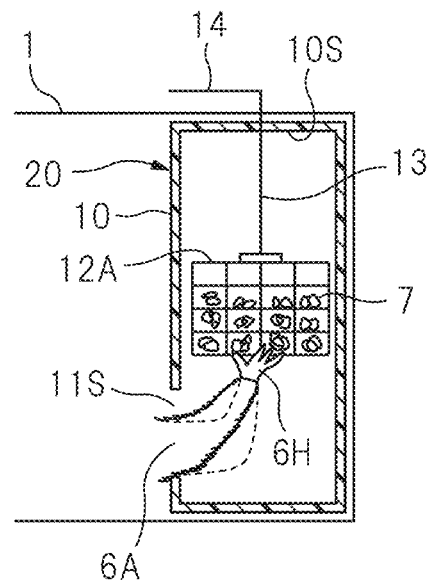
FIG. 3C is a cross-sectional view which shows the state of attachment of a third embodiment of the first type of the raccoon trapping module of the present invention which is shown in FIG. 2 to a wildlife trapping cage.

FIG. 3C shows the inside structure of a third embodiment of the first type of raccoon trapping module 20. At the inside of the housing 10 of the third embodiment, a bait cage 12A is provided as a baiting part in which bait is placed within a range which the hand 6H of a raccoon 6 can reach when a raccoon 6 inserts its forearm 6A, including the elbow, from the opening part 11S. The bait cage 12A is shaped as a box formed by wire and has bait 7 placed inside it.

In the raccoon trapping module 20 of the third embodiment, the raccoon 6 inserts its forearm 6A including the elbow into the opening part 11S, then bends its elbow as shown by the broken line and uses its hand 6H to pull against the bottom surface of the bait cage 12A, so the bait cage 12A is pulled toward the raccoon and the connecting member 14 moves through the wire 13. Further, the raccoon pulls against the bait cage 12A of the third embodiment and also pushes it up once then releases its hand to cause it to drop. In such a case, the force which is generated when gravity causes the bait cage 12A to drop makes the connecting member 14 move through the wire 13. The operation after movement of the connecting member 14 is the same as the first and second embodiments. Wildlife other than raccoons cannot insert their hands from the opening part 11S and use them to pull on the bottom surface of the bait cage 12A, so the door of the cage 1 never shuts. Accordingly, even if using a wildlife trapping cage 1 to which a raccoon trapping module 20 of the third embodiment is attached, it is possible to trap only raccoons and not trap other wildlife.

Figure 3D:
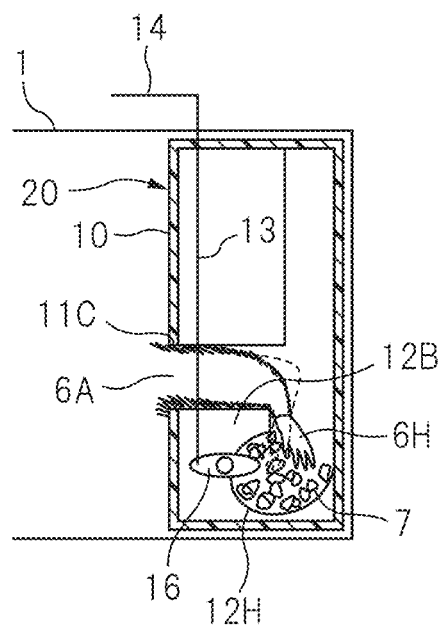
FIG. 3D is a cross-sectional view which shows the state of attachment of a fourth embodiment of the first type of the raccoon trapping module of the present invention which is shown in FIG. 2 to a wildlife trapping cage.

FIG. 3D shows the inside structure of a fourth embodiment of the first type of raccoon trapping module 20. The structure of the raccoon trapping module 20 of the fourth embodiment differs from the structures of the raccoon trapping module 20 of the first to third embodiments. In the fourth embodiment, the opening part 11 is a circular arm insertion hole 11C which is formed at a position provided with a predetermined height from the bottom end part of the front surface 10F, while the baiting part 12 is a bait container which comprises an arm rest 12B which is provided directly under the arm insertion hole 11C and a bait holding hole 12H which is provided in the direction returning from the front end of the arm rest 12B to the front. Deep in the bait holding hole 12H, a trigger member 16 which is connected to the connecting member 14 by a wire 13 is provided. Bait 7 is placed at the open side from this trigger member 16.

In the raccoon trapping module 20 of the fourth embodiment, the raccoon 6 inserts its forearm 6A including the elbow into the circular arm insertion hole 11C, then bends its elbow and turns its hand 6H downward as shown by the broken line to rummage through the bait 7 inside the bait holding hole 12H using its hand 6H. This being so, the trigger member 16 is turned by this operation, pulls the wire 13, and makes the connecting member 14 move through the wire 13. The operation after the connecting member 14 moves is the same as the first to third embodiments. Wildlife other than raccoons cannot insert their arms from the arm insertion hole 11C and turn them downward to rummage through bait 7 in the bait holding hole 12H, so the door of the cage 1 never closes. Accordingly, even if using the wildlife trapping cage 1 to which the raccoon trapping module 20 of the fourth embodiment is attached, it is possible to trap only raccoons: other wildlife is not trapped. The cross-sectional shape of the arm insertion hole 11C is not limited to a circular shape. For example, the hole may also be a triangular shaped hole or other polygonal shaped hole.

Figure 4A:
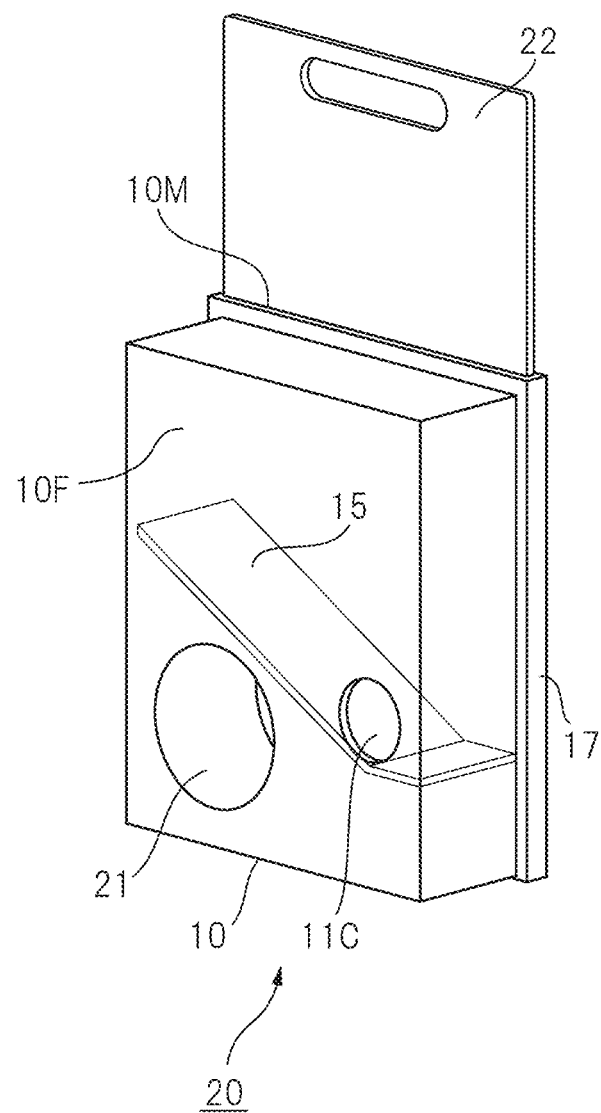
FIG. 4A is a see-through view which shows the inside structure of one embodiment of the third type of raccoon trapping module of the present invention which is shown in FIG. 2 as seen from the front surface side.

FIG. 4A shows the inside structure of one embodiment of the third type of raccoon trapping module 20 of the present invention which is shown in FIG. 2 as seen from the front surface side, while FIG. 4B shows the raccoon trapping module 20 which is shown in FIG. 4A as seen from the back surface side. The opening part which is provided at the front surface 10F of the housing 10 is a circular arm insertion hole 11C which is provided near the bottom end part of either the left or right of the front surface 11F. Inside the housing 10, a slope 15 is provided which inclines upward at a slant from the position of the arm insertion hole 11C. When the arm insertion hole 11C is provided near the bottom end part of the right side of the front surface 11F (state of FIG. 4A), the slope 15 rises to the left, while when the arm insertion hole 11C is provided near the bottom end part of the left side of the front surface 11F, the slope 15 rises to the right.

The third type of raccoon trapping module 20 is provided with a through hole 21 which runs through the housing 10, so the flange 17 has a built-in shutter plate 22. Note that of the second type of raccoon trapping module 20 of the present invention which is shown in FIG. 2 is just not provided with the through hole 21 of the housing 10. The structure is the same as the third type of raccoon trapping module 20, so the explanation will be omitted.

Figure 4C:
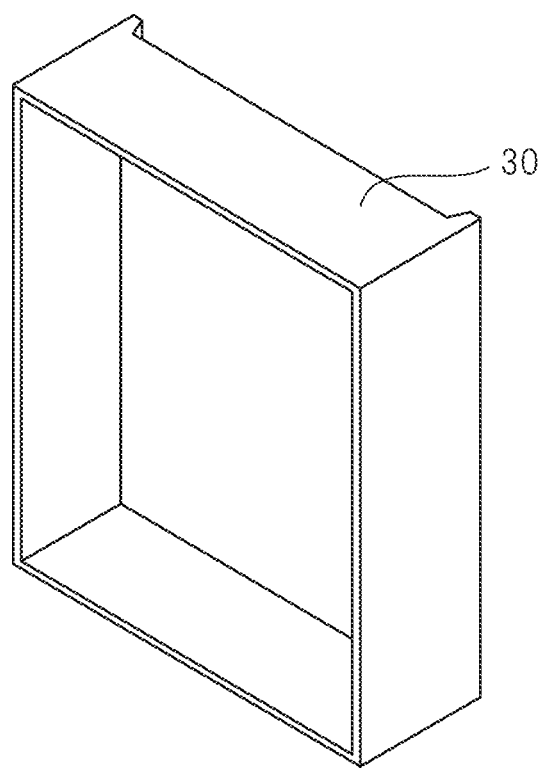
FIG. 4C is a perspective view of a light blocking cover which covers the outside of the raccoon trapping module from the outside of the cage at the end part of an existing wildlife trapping cage at which the raccoon trapping module of the present invention is attached.

Further, FIG. 4C shows a light blocking cover (outside housing) 30 which covers the outside of the raccoon trapping module 20 from the outside of the cage 1 at the end part of the existing wildlife trapping cage 1 to which the raccoon trapping module of the present invention 20 is attached. When the housing of the raccoon trapping module 20 as a whole is fabricated by a plastic which is provided with transparency so as to enable the bait 7 to be able to be seen from the outside, the bait 7 should be made to be able to be seen only from the inside of the cage 1. In such a case, the outside housing 30 conceals all of the raccoon trapping module 20 except for the front surface 10F of the housing 10. The inside dimensions of the outside housing 30 are larger than the outside dimensions of the cage 1. The housing is attached to the outside of the cage 1 so as to cover the end part of the cage 1. The outside housing 30 is formed by a light blocking member. Note that, when only the front surface 10F of the housing 10 is made by a plastic which is provided with transparency and when the other surfaces are made by a light blocking plastic, the outside housing 30 is not necessary.

Figure 5A:
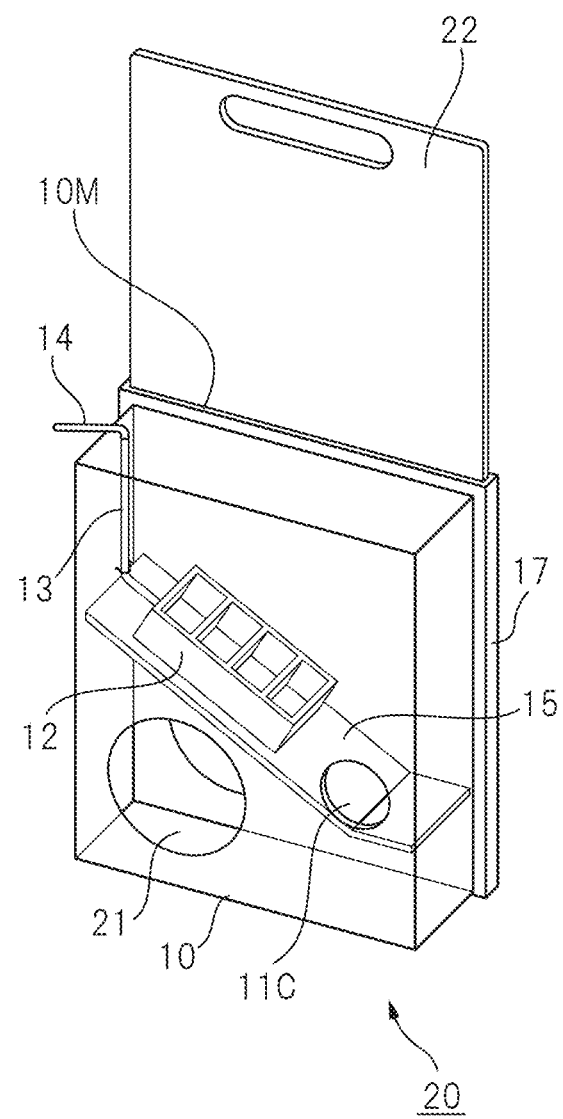
FIG. 5A is a see-through view which shows the state where a bait container is set at a slope at the inside of the third type of the raccoon trapping module which is shown in FIG. 4A.
Figure 5B:
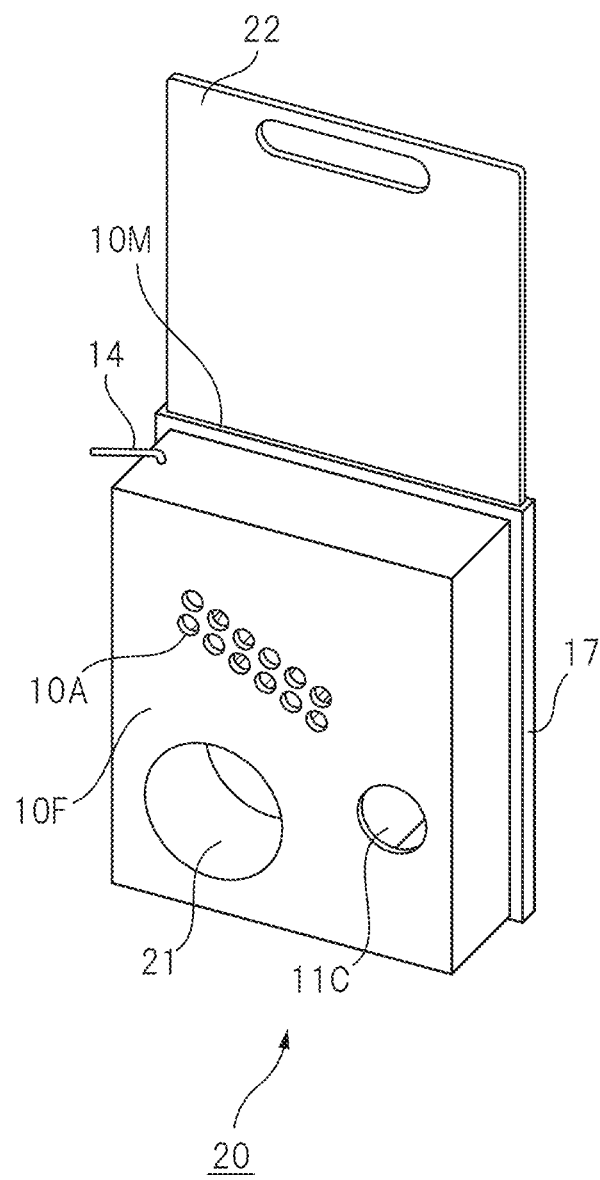
FIG. 5B is an outside view which shows a modified embodiment of the third type of raccoon trapping module which is shown in FIG. 5A.

FIG. 5A shows the state where a baiting part 12 is set at a slope 15 at the inside of the raccoon trapping module 20 which is formed as shown in FIG. 4A. The baiting part 12 is suspended by a wire 13 which is connected to the connecting member 14 and is provided to be able to slide on the slope 15. The baiting part 12 is box-shaped and can have bait inserted inside it. FIG. 5B shows a modified embodiment of the raccoon trapping module 20 which is shown in FIG. 5A. A small hole 10A is provided along the slope 15 of the front surface 10F of the housing 10. Even if providing the small hole 10A, the smell of the bait spreads inside of the cage 1, so the raccoon notices the presence of the bait.

Note that, if making the coefficient of friction between the baiting part 12 and the slope 15 larger and preventing the baiting part 12 placed on the slope 15 from sliding off, the baiting part 12 need not be suspended from a wire 13 which is connected to the connecting member 14. As the method of increasing the coefficient of friction between the baiting part 12 and the slope 15, there is the method of providing small wave-shaped relief shapes on the surface of the slope 15 and providing similar relief shapes on the bottom surface of the baiting part 12. Further, it is possible to attach sandpaper on the slope 15 to increase the frictional force.

Further, a mechanism where the linkage member 4 is pulled by movement of the connecting member 14 and where a lock release operation of the lock mechanism 3 is performed to close the door was explained, but it is also possible to add a drive mechanism which pulls on the connecting member 4 by input of the electrical signal to close the door and trap the raccoon. The switch for giving an electrical signal to the drive mechanism can for example be provided in the middle of the slope 15 which is shown in FIG. 5A. Specifically, it is sufficient to attach a roller to the bottom of the slope 15 to hold the baiting part 12 and turn on the switch when the baiting part 12 moves and the roller rotates and to provide a retractable projecting part in the middle of the slope 15 to engage with the baiting part 12 and turn on the switch when the baiting part 12 moves and the retractable projecting part retracts into the slope 15.

Figure 5C:
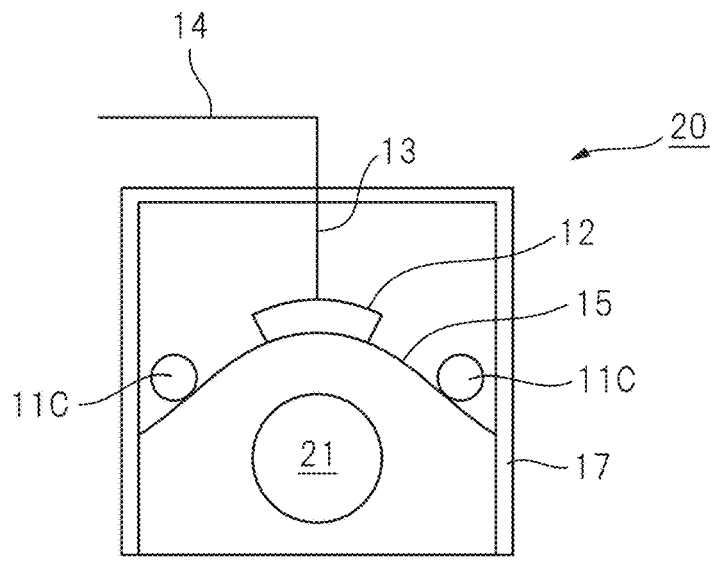
FIG. 5C is a schematic view which shows another modified embodiment of the third type of raccoon trapping module which is shown in FIG. 5A.

Further, the slope 15 need not be inclined in one direction. As shown in FIG. 5C, the slope 15 may also be inclined to the two sides from the center part. In this case, arm insertion holes 11C are provided at the two outskirts of the slope 15. Further, the baiting part 12 can be arranged at the vertex of the slope 15 connected to a wire 13.

Figure 5D:
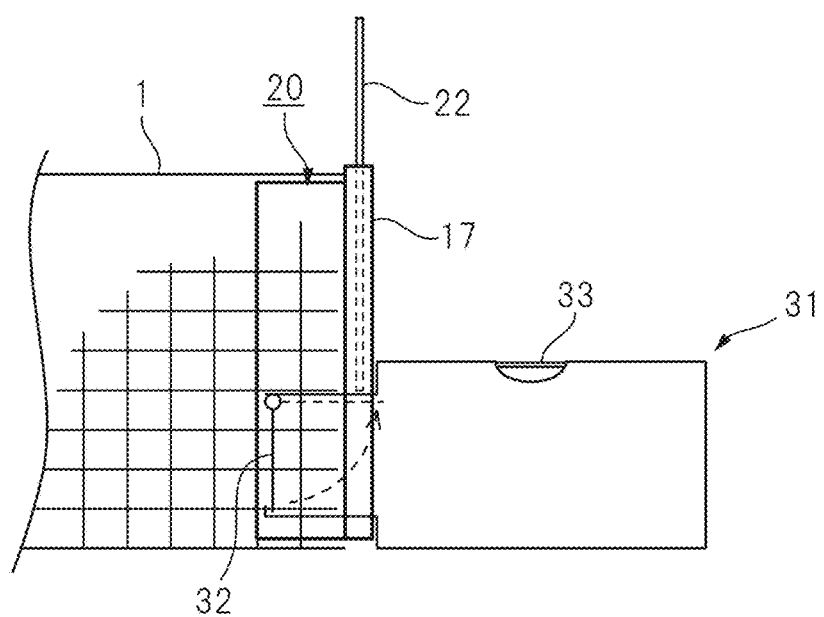
FIG. 5D is a side view which shows the state of attachment of a carry station to the rear of the third type of raccoon trapping module which is shown in FIG. 5A.

On the other hand, FIG. 5D is a side view which shows the state of attachment of a carry station 31 at the back side of the third type of raccoon trapping module 20 which is shown in FIG. 5A. The carry station 31 is inserted into the through hole 21 to be attached to the back side of the raccoon trapping module 20 in the state with the shutter plate 22 lifted up. At the entrance of the carry station 31, a shutter 32 which does not open to the outside and a carrying handle 33 is provided. The handle 33 does not stick out from the top surface of the carry station 31, so the carry stations 31 can be stacked. If the handle 33 sticks out from the top surface of the carry station 31, it is possible to provide a recessed part which can hold the handle 33 in the bottom surface of the carry station 31 and stack the carry stations 31.

Further, raccoons like dark locations, so the body of the carry station 31 is made of a members which block light or reduce light so as to make the inside of the carry station 31 dark. However, the shutter 32 is formed by a transparent member to enable it to be understood from inside the cage 1 that the inside of the carry station 31 is dark. For the members which form the body of the carry station 31, a dark colored plastic or metal or wood may be used. Due to this configuration, after a raccoon is trapped in the cage 1, the raccoon will push open the shutter 32 and easily enter inside the dark carry station 31. The shutter 32 does not open to the outside, so it is not possible to release the raccoon entering the inside of the carry station 31. The carry station 31 inside of which a raccoon is held is detached from the raccoon trapping module 20 and a new carry station 31 is attached to the raccoon trapping module 20.

The carry station 31 inside of which a raccoon is held is transported by being held by the handle 33 and is stored at a separate location. If raccoons continue to be trapped, the carry stations 31 are stacked for storage. Note that the bodies of the carry stations 31 are provided with air holes so that the raccoons can survive.

Figure 6A:
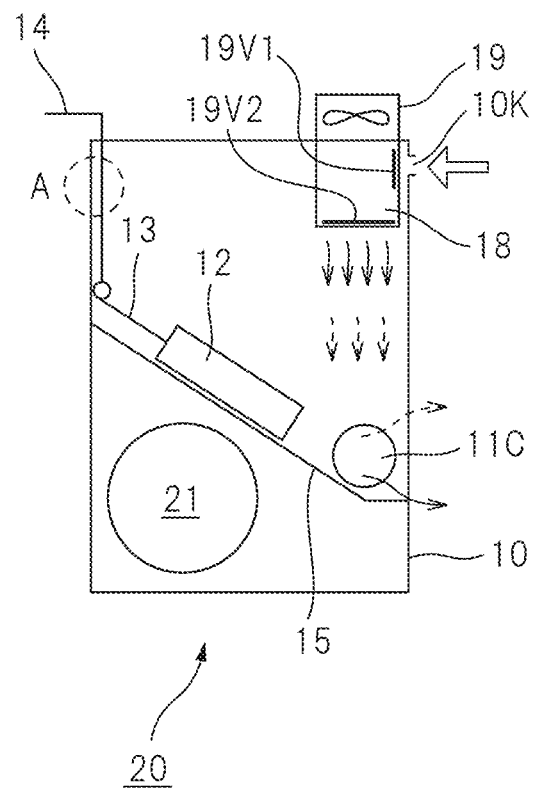
FIG. 6A is a front view which shows an embodiment which provides a scent agent which is provided with a lure action of luring raccoons and a fan which blows the scent from the scent agent to the outside of the housing in the third type of raccoon trapping module which is shown in FIG. 5A.
Figure 6B:
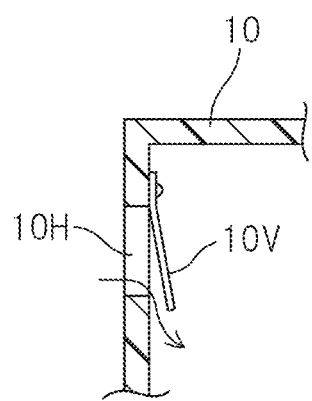
FIG. 6B is a partially enlarged cross-sectional view of a part A of FIG. 5A.

FIG. 6A shows an embodiment comprising the third type of raccoon trapping module 20 which is shown in FIG. 5A inside of which a scent agent 18 which is provided with a lure action luring raccoons and a fan 19 which releases a scent from the scent agent 18 to the outside of the housing 10 are provided. If providing an air intake port 10K at the housing 10 and running air which is taken from the outside through a scent agent 18 so as to release it to the outside from an arm insertion hole 11C which is provided in the housing 10, it becomes easy to lure a raccoon to the cage 1. In this case, as shown in FIG. 6B, another location of the housing 1 may also be provided with an air hole 10H provided with a valve 10V so as to suck outside air into the inside and increase the amount of scent released when the fan 19 is operating. The power supply of the fan 19 may be a battery or solar cell.

Note that, the fan 19 can be provided with a timer. The timer is set so as not to operate in the hours where raccoons are not that active and to prevent the scent of the scent agent 18 from being released from the raccoon trapping module 20 and to operate in the hours when raccoons are active (mainly night time) and release the scent. When the fan 19 does not operate, the scent of the scent agent 18 is prevented from leaking out to the inside of the raccoon trapping module 20 by the fan case which holds the scent agent 18 being provided with a valve 19V1 and valve 19VF2 at the entrance part of the air and the exit part of the air. If doing this, it is possible to use a timer to operate the fan 19 and release the scent agent 18 only when desiring to lure a raccoon and thereby more effectively trap raccoons and also reduce the supply of power from the power supply.

Figure 6C:
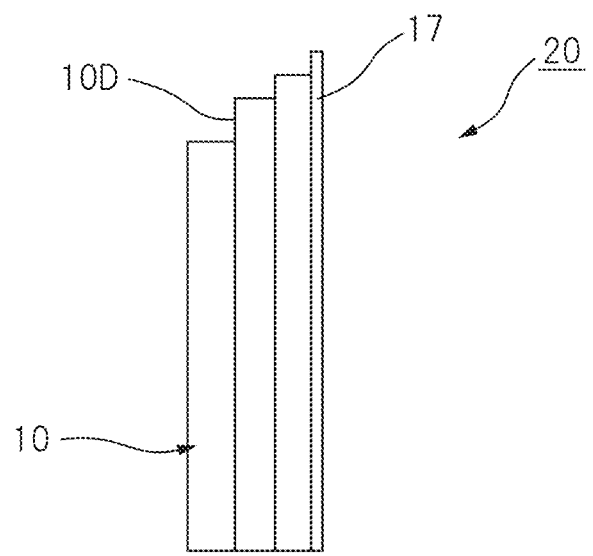
FIG. 6C is a side view which shows the housing structure of a raccoon trapping module of the present invention which can be matched with existing wildlife trapping cages of different inside dimensions.

FIG. 6C shows the structure of the housing 10 of the raccoon trapping module of the present invention 20 which can be matched with existing wildlife trapping cages 1 of different inside dimensions. When existing wildlife trapping cages 1 have different inside dimensions, if providing a step part 10D at the housing 10 matching their size, it becomes possible to attach the raccoon trapping module 20 to a plurality of types of wildlife trapping cage 1.

Figure 7A:
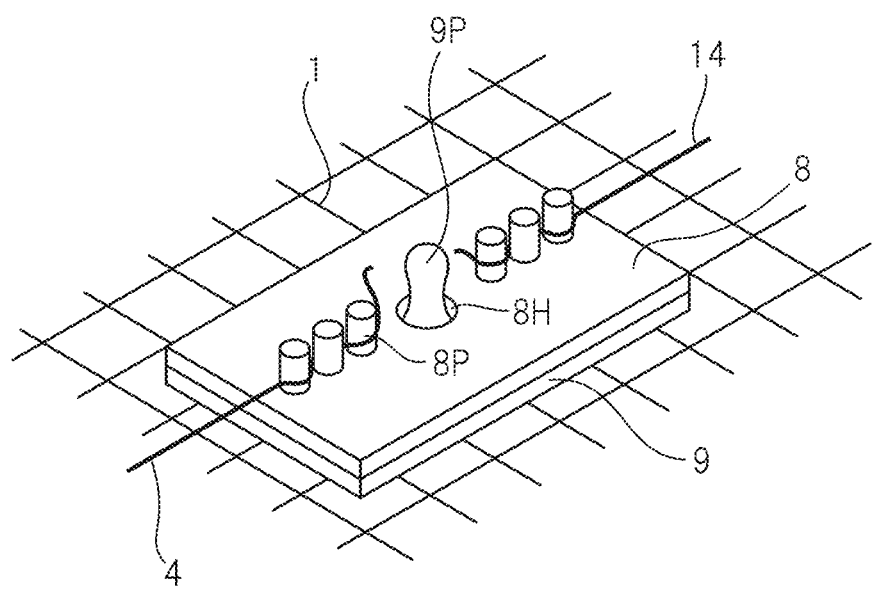
FIG. 7A is an assembled perspective view which shows the structure of a relay member which connects a linkage member which is provided at an existing wildlife trapping cage and a connecting member which is provided at a raccoon trapping module of the present invention and the structure of a holding member which attaches the relay member to the wildlife trapping cage.

FIG. 7A shows the structure of the relay member 8 which connects the linkage member 4 which is provided at an existing wildlife trapping cage 1 and a connecting member 14 which is provided at the raccoon trapping module 20 of the present invention and the structure of the holding member 9 which attaches the relay member 8 to the wildlife trapping cage 1. In this embodiment, the center part of the holding member 9 is provided with an engagement projecting part 9P, while the center part of the relay member 8 is provided with a hole 8H through which this engagement projecting part 9P is inserted. Further, the relay member 8 is provided with a plurality of projecting parts P for adjusting tension. The linkage member 4 and the connecting member 14 are engaged by being wound around the projecting parts 8P zigzag so as to match the tensile force in the set state. The member for adjusting the tension of the linkage member 4 and the connecting member 14 is not limited to the projecting part 8P of this embodiment. The engagement projecting part 9P which is provided at the center part of the holding member 9 is formed by a flexible material.

The reason for providing the relay member 8 between the connecting member 14 and linkage member 4 in this way is that the bait cage (baiting part) 12 of the present invention is suspended by a wire in each case, so a pulling force due to gravity acts on the connecting member 14. Therefore, to prevent a pulling force due to gravity from being transmitted from the connecting member 14 to the linkage member 4 and the door of the cage 1 mistakenly shutting, a relay member 8 is provided between the connecting member 14 and the linkage member 4, and a pulling force due to gravity is not transmitted from the connecting member 14 to the linkage member 4.

Figure 7B:
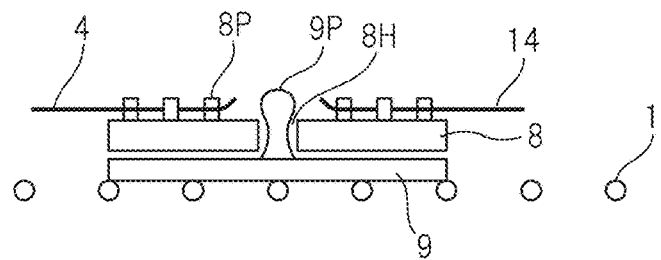
FIG. 7B is a side view which shows the state where a linkage member and a connecting member are connected through a relay member.
Figure 7C:
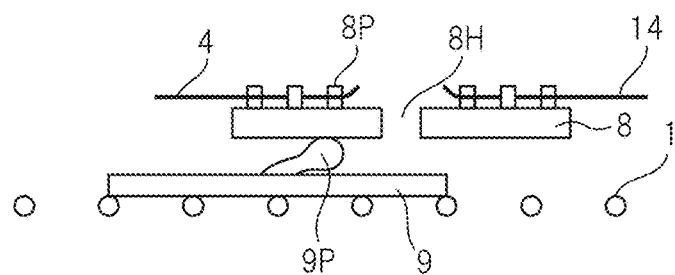
FIG. 7C is an explanatory view which shows the operation of the relay member when a raccoon which enters the wildlife trapping cage takes bait.

FIG. 7B shows the state where the linkage member 4 and the connecting member 14 are connected through the relay member 8. In the state where a raccoon is not trapped, the hole 8H of the relay member 8 engages with the engagement projecting part 9P of the holding member 9. Therefore, even if some pulling force not related to the trapping of the raccoon is applied to the connecting member 14 is applied, the pulling force is stopped by the engagement projecting part 9P and pulling force not related to trapping of the raccoon is not transmitted to the linkage member 4. On the other hand, when a large pulling force is generated at the connecting member 14 due to the raccoon taking bait, as shown in FIG. 7C, the projecting part 9P of the holding member 9 is knocked down and the relay member 8 moves away from the holding member 9. As a result, the connecting member 14 can be connected to the linkage member 4 and the door of the cage 1 can be shut to trap the raccoon.

Figure 8:
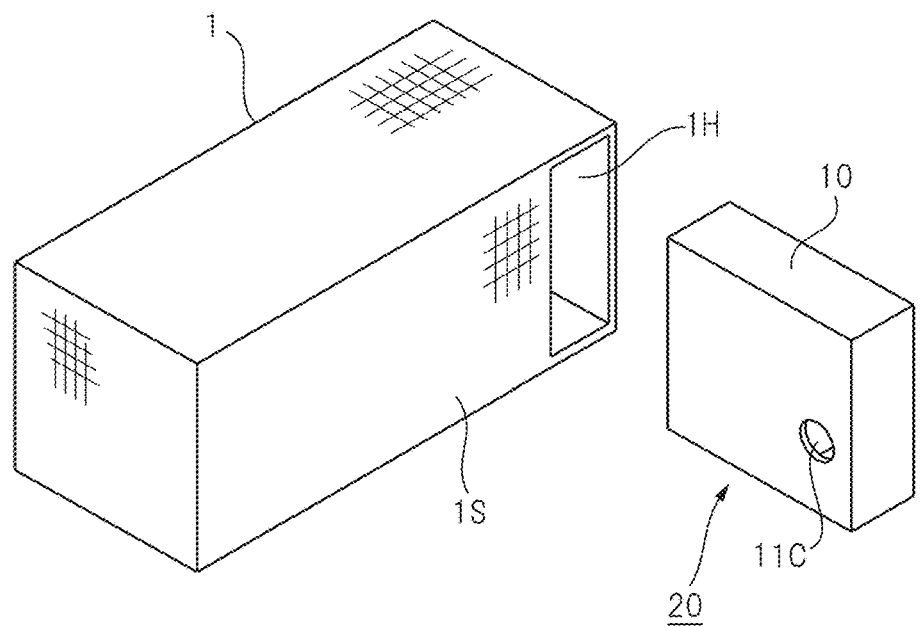
FIG. 8 is a perspective view which shows an embodiment which provides a hole at a side surface of an existing wildlife trapping cage and attaches the raccoon trapping module of the present invention at it.

FIG. 8 shows an embodiment of provision of a horizontal hole 1H at the side surface 1S of an existing wildlife trapping cage 1 as a module mounting hole and attachment of the raccoon trapping module of the present invention 20. In this way, the raccoon trapping module of the present invention 20 can be attached not only from the back end part of an existing wildlife trapping cage 1, but also to an existing wildlife trapping cage 1 from the side surface. Other than this as well, even with a larger size wildlife trapping cage, attachment becomes possible by opening a hole.

Figure 9A:
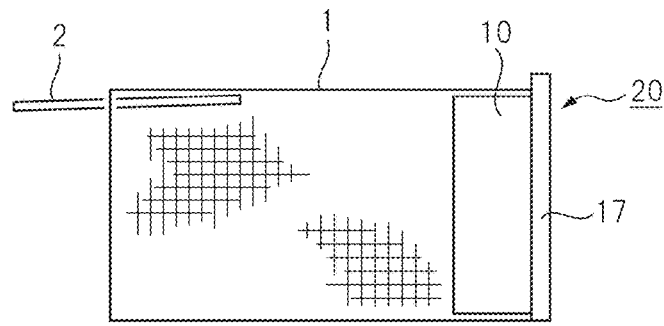
FIG. 9A is a side view which shows the state of the raccoon trapping module which is shown in FIG. 2 attached inserted at the inside of the cage.
Figure 9B:
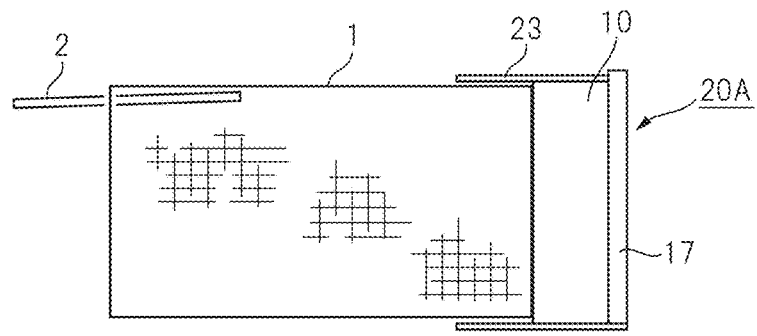
FIG. 9B is a side view which shows the state of the raccoon trapping module attached fit at the outside of the cage by a mounting frame.
Figure 9C:
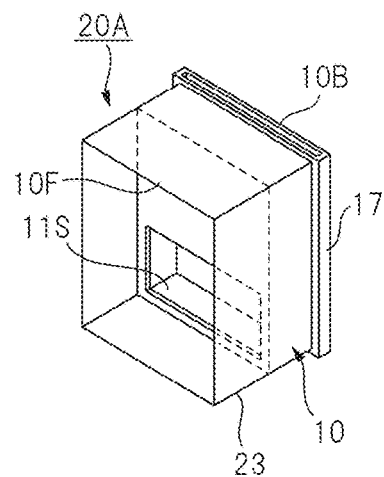
FIG. 9C is a perspective view which shows the appearance of the first type of the raccoon trapping module provided with a mounting frame.
Figure 9D:
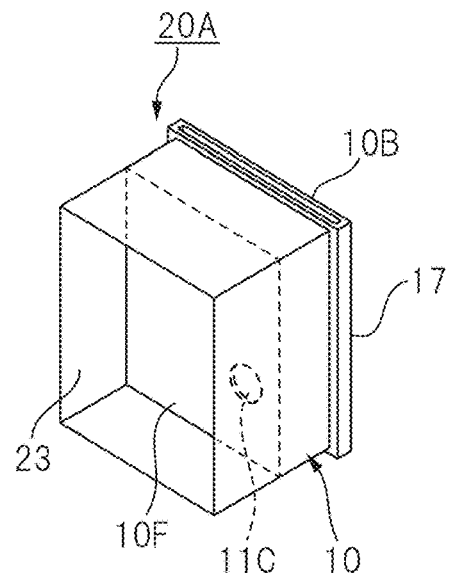
FIG. 9D is a perspective view which shows the appearance of the second type of the raccoon trapping module provided with a mounting frame.
Figure 9E:
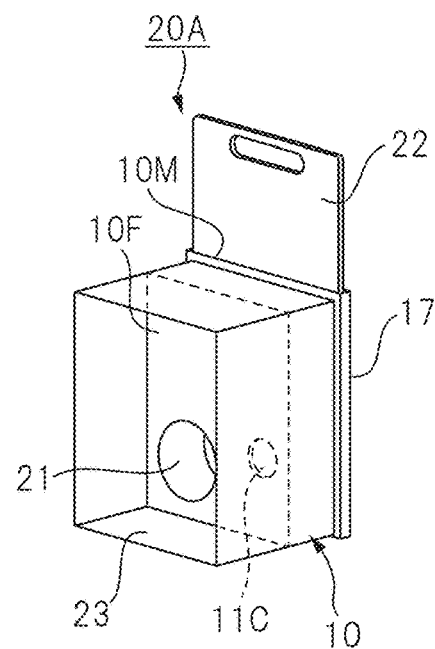
FIG. 9E is a perspective view which shows the appearance of the third type of the raccoon trapping module provided with a mounting frame.

In the raccoon trapping module 20 of the embodiment which is explained above, as shown in FIG. 9A, the raccoon trapping module 20 was attached inserted at the inside of the cage 1. On the other hand, a raccoon trapping module 20A which is shown from FIG. 9C to FIG. 9E provided with a mounting frame 23 around the front surface 10F of the three types of raccoon trapping module 20 which were explained in FIG. 2 is possible. The mounting frame 23 can be provided integrally with the housing 10. The inside dimensions of the mounting frame 23 are equal to the outer shape dimensions of the cage 1 around the module mounting hole 1B at the opposite side to the entrance 1F of the cage 1. Accordingly, the three types of raccoon trapping module 20A which are shown in FIG. 9C to FIG. 9E, as shown in FIG. 9B, can be attached by fitting the mounting frame 23 at the outside of the cage 1.

Figure 10A:
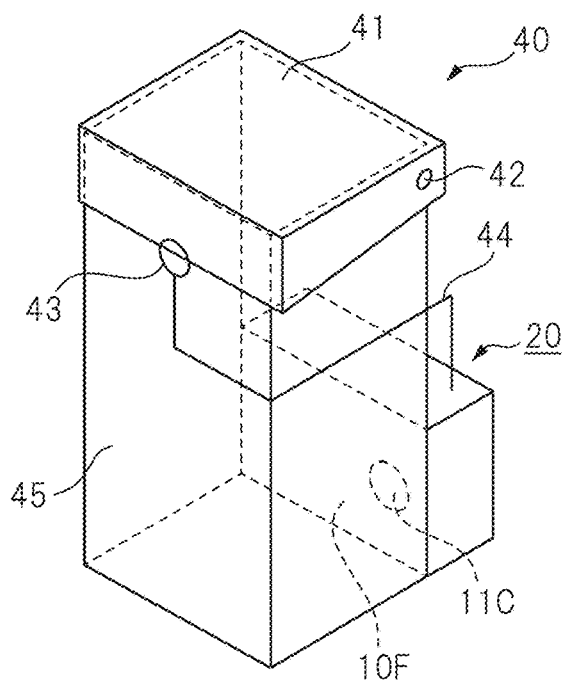
FIG. 10A is a perspective view which shows the state of the raccoon trapping module attached to a vertical holding container with a lid.

FIG. 10A shows the state where the raccoon trapping module 20 which is shown in FIG. 2 is attached to a vertical holding container 40 with the lid 41. The vertical holding container 40 is provided with a hollow columnar container body 45 which is provided with a top opening and a bottom surface, a lid 41 of the top opening which pivots supported by a shaft 42 at the side surfaces of the top part of the columnar container body 45, and a lock mechanism 43 which locks the lid 41 in the closed state. When the raccoon trapping module 20 is the second type, a hole of the same extent as the arm insertion hole 11C at the front surface 10F of the raccoon trapping module 20 may be provided at the bottom part of the back surface of the columnar container body 45 and the raccoon trapping module 20 attached.

The structure of the raccoon trapping module 20 was already explained, so the explanation will be omitted here. The baiting member which is provided at the inside of the housing 10 of the raccoon trapping module 20 is connected by the transmission member 44 to the lock mechanism 43. For the transmission member 44 which connects the baiting member and the lock mechanism 43, any of an electrical mechanism, mechanical mechanism, or hydraulic mechanism may be used.

Figure 10B:
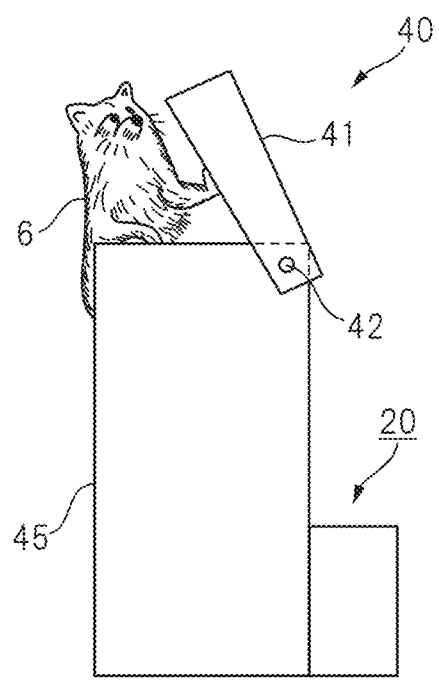
FIG. 10B is a side view which shows the state when a raccoon enters the vertical holding container which is shown in FIG. 10A.

As shown in FIG. 10B, even if the vertical holding container 40 is provided with a lid 41, the raccoon 6 can climb up the columnar container body 45 and open the lid 41 by its hands to enter the inside. Accordingly, if the raccoon 6 opens the lid 41 to enter the columnar container body 45 and the raccoon acts to take bait from the baiting member in the state with the lid 41 closed, the raccoon 6 can be trapped if the transmission member 44 makes the lock mechanism 43 lock the lid 41.

Figure 10C:
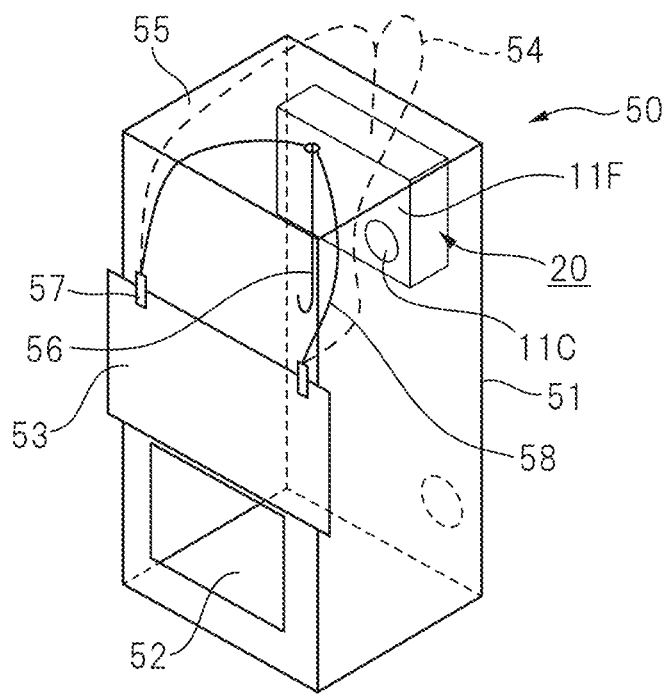
FIG. 10C is a perspective view which shows the state of the raccoon trapping module attached to a vertical box-shaped animal trapping cage.

FIG. 10C shows the state of attachment of the raccoon trapping module 20 to the vertical box-shaped animal trapping cage 50. The vertical box-shaped animal trapping cage 50 is provided with a vertical box-shaped cage body 51, a door 53 which opens and closes the entrance part 52 at the bottom part of one side surface of the cage body 51, a lock mechanism 57 which locks the door 53 in the open state, and a baiting hook 56 which is suspended from a ceiling part 55 of the cage body 51. The hook 56 is connected to the lock mechanism 57 by the linkage member 58. When an animal which enters the inside of the cage body 51 acts to take bait which is hung on the hook 56, due to the operation of the linkage member 58, the lock mechanism 57 performs a lock release operation.

The raccoon trapping module 20 is attached to the inside wall part at the top of the cage body 51. For the raccoon trapping module 20, any of the first and second types of raccoon trapping module 20 which are shown in FIG. 2 can be attached. The structure of the raccoon trapping module 20 was already explained, so its explanation will be omitted here. The baiting member which is provided at the inside of the housing 10 of the raccoon trapping module 20 is connected by the transmission member 54 to the lock mechanism 57. The transmission member 54 which connects the baiting member and the lock mechanism 57 can be made the same mechanism as the linkage member 58 which connects the baiting hook 56 and the lock mechanism 57.

In a vertical box-shaped animal trapping cage 50, if a raccoon 6 enters from the entrance part 52 to the inside of the cage body 51 and the raccoon acts to take bait from the baiting member of the raccoon trapping module 20, the transmission member 54 makes the lock mechanism 57 perform a lock release operation. As a result, the door 53 shuts and the raccoon 6 can be trapped. In this case, if placing bait at the baiting hook 56, it is possible to trap just raccoons.

As explained above, according to the present invention, by attachment to an existing cage for trapping wildlife, it is possible to use this cage to trap only raccoons. Further, it becomes possible to form a raccoon trapping system comprised or a cage or container to which a raccoon trapping module of the present invention is attached.

The invention claimed is:

1. A raccoon trapping module configured to attach to an existing wildlife trapping cage having at least a cage configured to hold wildlife, a door which opens and closes an entrance at an entrance side of the cage, a lock mechanism which locks the door in an open state, and a linkage member which links the lock mechanism to a trigger member configured to perform a lock release operation of the lock mechanism when wildlife engages in the action of taking bait, the raccoon trapping module comprising:

a hollow housing which is configured to attach to an opposite side of the entrance side of the cage, an arm insertion hole provided on a surface of the hollow housing, the arm insertion hole sized to receive a hand, a wrist, a forearm, and an elbow of a raccoon, a baiting member in which bait is placed, wherein the baiting member is provided at a position inside of the hollow housing within a range that the hand of the raccoon cannot reach except for when the raccoon inserts its forearm from the arm insertion hole and bends its elbow and wrist, and a wire which is configured to connect the linkage member of the cage to the baiting member of the raccoon trapping module, wherein the baiting member is suspended by the wire at a vertical position higher than the arm insertion hole.

2. The raccoon trapping module according to claim 1, wherein an outer edge part of the hollow housing at a surface at the opposite side to the entrance side is formed with a flange part and the hollow housing is fastened by being inserted from the hole inside the cage up to the position which the flange part abuts.

3. The raccoon trapping module according to claim 1, wherein a surface of the hollow housing at the entrance side is provided with a mounting frame and the outside of the hole of said wildlife trapping cage is inserted inside of the mounting frame so as to attach the housing to the wildlife trapping cage.

4. The raccoon trapping module according to claim 1, wherein the hollow housing is fastened by being inserted in the cage from a horizontal hole which is provided in a side surface of the cage at a module mounting hole side.

5. The raccoon trapping module according to claim 1, wherein the arm insertion hole is a hole which is provided at a bottom part of the surface of the entrance side, a slope is provided at the inside of the hollow housing so as to be inclined from the position of the arm insertion hole upward at a slant, and the baiting member is placed in a state engaged on the slope and slides on the slope by the action of the raccoon taking the bait.

6. The raccoon trapping module according to claim 1, wherein the hollow housing is provided with a through hole which runs in the front-back direction of the hollow housing and a shutter plate which opens and closes the through hole, the through hole is configured to attach to a carry station which is provided with a volume for holding the raccoon from the outside, the carry station is provided with a shutter which only opens to the inside and with a handle, and configured to allow the raccoon to pass through the through hole and to be held in the carry station to be transported by the carry station to another location.

7. The raccoon trapping module according to claim 6, wherein the carry station is configured to be stacked.

8. The raccoon trapping module according to claim 7, wherein the carry station has a surface at the entrance side opening made of plastic which is provided with a transparency which enables the bait to be seen and other surfaces made of light blocking members.

9. The raccoon trapping module according to claim 1, further comprising a scent generator which is provided with a lure action of luring raccoons to the inside of the hollow housing and a fan which releases a scent from a scent agent to the outside of the housing.

10. The raccoon trapping module according to claim 9, further comprising a timer, wherein the timer is set so as to operate the fan in hours in which raccoons are active.

11. The raccoon trapping module according to claim 1, further comprising a relay member, and wherein a free end part of the connecting member is connected through the relay member to the linkage member.

12. The raccoon trapping module according to claim 11, wherein the relay member is held by a holding member which is set on the cage and is detached from the holding member to connect the connecting member with the linkage member when a predetermined pulling force is applied from the connecting member.

13. A raccoon trapping system comprising:

a cage which holds wildlife, a door which opens and closes an entrance at one end of the cage, a lock mechanism which locks the door in an open state, a linkage member which links the lock mechanism to a trigger member configured to perform a lock release operation of the lock mechanism when wildlife engages in the action of taking bait, and a raccoon trapping module comprising:

a hollow housing which is configured to attach to an opposite side of the entrance side of the cage, an arm insertion hole provided on a surface of the hollow housing, the arm insertion hole sized to receive a hand, a wrist, a forearm, and an elbow of a raccoon, a baiting member in which bait is placed, wherein the baiting member is provided at a position inside of the hollow housing within a range that the hand of the raccoon cannot reach except for when the raccoon inserts its forearm from the arm insertion hole and bends its elbow and wrist, and a wire which is configured to connect the linkage member of the cage to the baiting member, wherein the baiting member is suspended by the wire at a vertical position higher than the arm insertion hole, wherein the trigger member performs the lock release operation when the wildlife engages in the action of taking bait from the baiting member.

\* \* \* \* \*